2,701,781

AQUEOUS CHLORINE DIOXIDE ANTISEPTIC COMPOSITIONS AND PRODUCTION THEREOF

Moises L. de Guevara, Mexico City, Mexico, assignor, by mesne assignments, of fifty-seven and one-half per cent to Charles Van Buren, Washington, D. C., and forty-two and one-half per cent to Pearlman, Baldridge, Lyons and Browning, Washington, D. C.

No Drawing. Application December 30, 1949,
Serial No. 136,149

9 Claims. (Cl. 167—17)

This invention relates to new antiseptic compositions having great antiseptic strength. It is also concerned with methods for the production of these new products.

Innumerable materials have been tested and experimented with in order to uncover successful antiseptics for general application. Notwithstanding the large amount of investigation made in this field, a really satisfactory, universal antiseptic has not been provided heretofore. One of the most common and widely used antiseptics is tincture of iodine, but this possesses the well-known defect of being very irritating to the body tissues to which it is applied, causing considerable discomfort at the time of application and quite often subsequent thereto.

Numerous other materials, such as organic mercury compounds, quaternary ammonium salts and the like, have been suggested and used as antiseptics in an effort to obtain products which have high antiseptic strength, but low irritating characteristics. These latter developments in this field offer improvements of the more historic tincture of iodine, but it is rather generally recognized that known antiseptics of high potency are inclined to be relatively highly irritating.

A principal object of this invention is the provision of new antiseptic compositions which have high antiseptic qualities.

Further objects include:

(1) The provision of antiseptic compositions having a phenol coefficient at least three times as great as a 3% iodine tincture.

(2) The provision of new antiseptics which have a water base, thus eliminating need for presence of alcohol and the attendant irritating qualities thereof.

(3) The provision of new compositions having such high antiseptic properties that they may be used as general disinfectants and preservatives.

(4) The provision of such compositions which have desirable properties.

(5) The provision of antiseptic compositions containing chlorine dioxide in the form of a labile complex in an aqueous solution, whereby chlorine dioxide become available for use as an active antiseptic material when the aqueous solution, containing the complex, is contacted with body tissues.

(6) The provision of a new method for stabilizing chlorine dioxide in water solution against rapid decomposition so that the solution may be stored for relatively long periods of time, and chlorine dioxide can be drawn therefrom when brought into contact with substances with which it will react.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished in accordance with the present invention by forming an antiseptic composition from an aqueous solution of chlorine dioxide and an inorganic boron compound with the boron compound and chlorine dioxide being present in the solution as a labile complex. Basically, this is accomplished by bringing chlorine dioxide in contact with an inorganic boron compound in the presence of an excess of water and allowing the two to combine. The chlorine dioxide can be generated in situ or externally of the solution or suspension of the boron compound, as will become more clear from the discussion given below.

The following examples, in which all parts indicated are by weight, of actual operations in accordance with this invention, are given in order to provide an easy comprehension of the type of materials and procedures with which the invention is concerned.

Example I

An antiseptic composition is produced from the following ingredients:

| | Parts |
|---|---|
| Sodium tetraborate | 20 |
| Boric acid | 20 |
| Sodium perborate | 3 |
| Potassium chlorate | 2 |
| Sulfuric acid | 1 |
| Hydrochloric acid | 1 |
| Para amino benzoic acid | .1 |
| Dye | 0.1 |

Water in an amount to make 1000 parts.

The sodium tetraborate and boric acid are first dissolved in the water and then the hydrochloric acid is added. When a homogeneous solution is obtained, potassium chlorate is fully dissolved therein, the perborate is added and dissolved, and the sulfuric acid is then added. Finally, the amino benzoic acid and dye are incorporated in the solution.

A clear product is obtained which can be stored for an indefinite period without any apparent change in composition or appearance.

When tested for phenol coefficiency by standard clinical methods, using *E. typhosa* and *Staph. aureus* as the test organisms, the phenol coefficiency of the product is found to be approximately three times as strong as a 3% tincture of iodine. The irritative tendency of the product is found to be completely negative when tested by the standard "eye" and "under the tongue" tests upon clinical animals.

Example II

An antiseptic composition is prepared from a combination of sodium perborate and chlorine dioxide. To accomplish this, 8 parts of sodium perborate are suspended in 100 parts of water at 20° C. Chlorine dioxide is then slowly bubbled into the suspension until a clear, faintly yellow colored solution is obtained.

The composition is found to possess strong oxidizing and antiseptic properties. Chlorine dioxide is apparently held in the form of a labile complex with the boron compound, because the solution does not undergo the rapid decomposition of chlorine dioxide in water. On the other hand, the chlorine dioxide is held in a readily releasable state, as evidenced by the fact that the characteristic analytical tests for the compound readily establish the presence of large quantities of the compound in the solution.

Example III

An antiseptic composition is produced from the following ingredients by the procedure described in Example I.

| | Parts |
|---|---|
| Sodium tetraborate | 15 |
| Boric acid | 15 |
| Potassium chlorate | 1 |
| Sulfuric acid | 0.1 |
| Sodium perborate | 3 |
| Hydrochloric acid | 1 |

Water to make 1000 parts.

A product is obtained similar in appearance and characteristics of the antiseptic of Example I, although the phenol coefficient is slightly less than that of the former.

Example IV

An antiseptic composition is produced from the following ingredients:

| | Parts |
|---|---|
| Sodium tetraborate | 30 |
| Boric acid | 30 |
| Potassium chlorate | 10 |
| Sulfuric acid | 7 |
| Sodium perborate | 10 |
| Hydrochloric acid | 8 |
| Para amino benzoic acid | 4 |
| Water to make 1000 parts. | |

A clear solution, similar to that obtained in Example I, as obtained.

*Example V*

An antiseptic is prepared by mixing 5 parts of urea with 1000 parts of the antiseptic composition, as prepared in Example I.

As has been explained above, chlorine dioxide, fixed in a stable condition, is an essential ingredient of these new antiseptic products. The chlorine dioxide may be introduced into the compositions either by generation in situ or generation externally of the ingredient mixture and introduced therein, as by bubbling into the aqueous solution. Various methods may be employed for the external production of the chlorine dioxide, such as reaction of sulfuric acid upon potassium chlorate or the reaction of the chlorate with moist oxalic acid. In Examples I, III and IV, given above, on the other hand, chlorine dioxide is generated in situ through the reaction of the potassium chlorate and the sulfuric acid.

A second essential ingredient of the new antiseptic is an inorganic boron compound. Several inorganic boron compounds have the property of stabilizing chlorine dioxide in water solution by formation of a labile complex, but the inorganic boron oxide compounds are preferred for this purpose, such as sodium tetraborate, boric acid and, especially, sodium perborate.

The components of my new antiseptic materials may be included in various proportions, although all proportions do not give identical results. Although, proportions outside these limits can be used under some circumstances, the preferred limits on proportions for the preferred materials of the compositions are as follows:

| | Parts |
|---|---|
| Sodium tetraborate | 15 to 30 |
| Potassium chlorate | 1 to 10 |
| Boric acid | 15 to 30 |
| Sodium perborate | 3 to 10 |
| Mineral acid | 1 to 15 |

In addition to the above indicated, preferred ingredients, water is an important ingredient and should be present in about 1000 parts for the total number of parts of the other ingredients, as indicated above. Furthermore, color and perfumes may be added in small quantities, such as 0.1 to 2 parts, where this is desirable.

Additional antiseptic strength to the compositions and increased stability can be obtained by the addition of amino monocyclicaryl monocarboxylic acids, such as para-amino benzoic acid, 4-amino 2-methyl benzoic acid, 4-amino 3-propyl benzoic acid and the like.

Although the new antiseptic, containing only boron compounds and chlorine dioxide, or the ingredients necessary to generate these materials in situ, can be used for known antiseptic purposes, it is preferable to add urea in the amount of about 1–10 parts for each 1000 parts of the preferred compositions, as described above, when an oral antiseptic is desired.

Sodium tetraborate has been indicated as a useful material for the new compositions in the above examples. This may be substituted by antipyonin or neutral borax; and these materials, plus boric acid and sodium perborate, comprise the preferred inorganic boron compounds for use in connection with this invention.

The preferred mineral acids for inclusion in the antiseptic are hydrochloric and/or sulfuric acid.

The exact nature of the chemical reaction which takes place in the formation of these new antiseptics is not certain and detailed discussion thereof is unwarranted. However, it has been established that the chlorine dioxide is present in substantial quantity in these new antiseptics and is held in the aqueous solutions in some stable form in a labile condition in which it becomes available for use, having the known bactericidal action of a chlorine dioxide solution.

It will be recognized that modifications of these antiseptics can be made as necessary to meet the requirements of particular cases of application and other circumstances. Thus, where desired, it is possible to include such known medicants as alcohol or other materials in the antiseptics, or to mix these new compositions with other compatible antiseptics, if this is felt desirable or required under given circumstances.

I claim:

1. As a new antiseptic composition, an aqueous solution comprising chlorine dioxide and sodium perborate.

2. As a new antiseptic composition, an aqueous solution comprising chlorine dioxide, sodium perborate and boric acid.

3. As a new antiseptic composition, an aqueous solution comprising chlorine dioxide, sodium perborate, boric acid and sodium tetraborate.

4. A new stable chlorine dioxide aqueous solution formed of the following ingredients in the quantity indicated as parts by weight:

| | Parts |
|---|---|
| Sodium tetraborate | 15 to 30 |
| Potassium chlorate | 1 to 10 |
| Boric acid | 15 to 30 |
| Sodium perborate | 3 to 10 |
| Mineral acid | 1 to 15 |

5. A new stable chlorine dioxide aqueous solution formed of the following ingredients in the quantity indicated as parts by weight:

| | Parts |
|---|---|
| Sodium tetraborate | 20 |
| Boric acid | 20 |
| Potassium chlorate | 2 |
| Sodium perborate | 3 |
| Sulfuric acid | 1 |
| Hydrochloric acid | 1 |
| Para aminobenzoic acid | 1 |
| Water to make 1000 parts. | |

6. A composition as claimed in claim 5 containing a minor amount of coloring matter and perfume.

7. A new stable chlorine dioxide aqueous solution formed of the following ingredients in the quantity indicated as parts by weight:

| | Parts |
|---|---|
| Sodium tetraborate | 15 to 30 |
| Boric acid | 15 to 30 |
| Potassium chlorate | 1 to 5 |
| Sulfuric acid | 0.1 to 7 |
| Hydrochloric acid | 0.9 to 8 |
| Sodium perborate | 3 to 10 |
| Para aminobenzoic acid | 0.5 to 5 |

8. A new oral antiseptic consisting of a mixture of 1 to 10 parts of urea for each 1000 parts of the composition as claimed in claim 7.

9. A process for the formation of non-irritating antiseptic compositions that are non-toxic to body tissue and have a phenol coefficient at least three times as great as a 3% iodine tincture which comprises forming an aqueous solution of a labile complex of chlorine dioxide and an inorganic boron compound by bringing chlorine dioxide into contact with said inorganic boron compound in the presence of an excess of water, said boron compound being sodium perborate.

References Cited in the file of this patent

UNITED STATES PATENTS

| | | |
|---|---|---|
| 428,033 | Alson | May 13, 1890 |
| 2,071,091 | Taylor | Feb. 16, 1937 |
| 2,071,094 | Vincent | Feb. 16, 1937 |
| 2,379,335 | Baker | June 26, 1945 |

OTHER REFERENCES

Holder: J. A. M. A., vol. 108, No. 14, pp. 1167–8.

Taylor et al.: Industrial and Engineering Chemistry, July 1940, pp. 899–903.

Parks: Mellor's Modern Inorganic Chemistry, Longmans Green & Co., N. Y., 1939, pp. 506–507, 516, 517.

Pharmaceutical Formulas, vol. 1, eleventh ed., Chemist and Druggist, London 1944, page 208.